INVENTOR.
Jacob J. Weier.

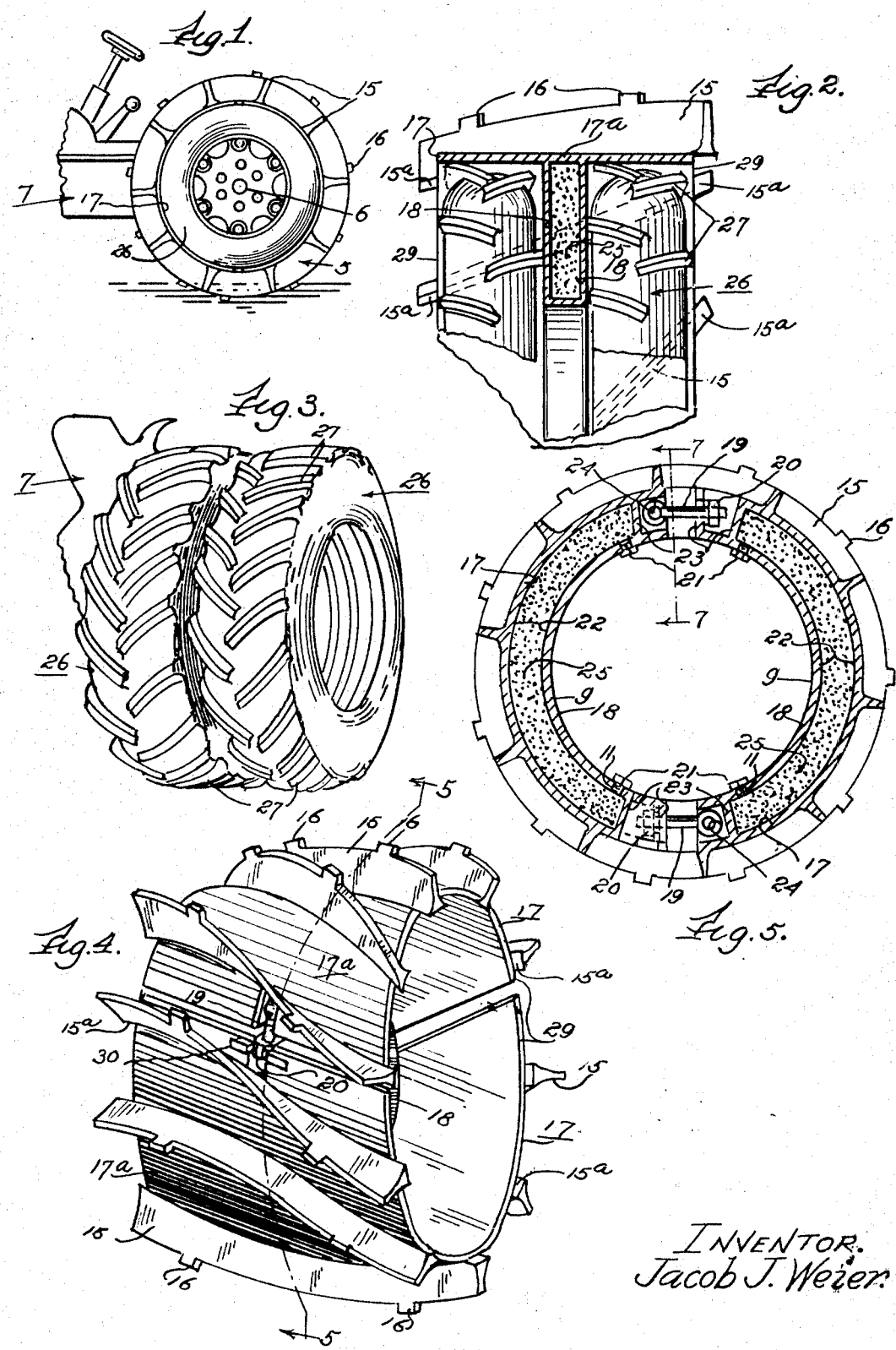

United States Patent Office 3,435,873
Patented Apr. 1, 1969

3,435,873
TRACTION ATTACHMENTS FOR DUAL
PNEUMATIC TIRES
Jacob J. Weier, 10611 S. Sawyer Ave.,
Chicago, Ill. 60655
Filed Nov. 10, 1966, Ser. No. 593,405
Int. Cl. B60c 27/16; B60b 15/26
U.S. Cl. 152—182                                  5 Claims

ABSTRACT OF THE DISCLOSURE

A circular metal-retread covering for dual rubber tires. These metal-retread coverings are made particularly for large dual pneumatic tires on the driving wheels of motor vehicles, such as logging tractors, swamp buggies and farm tractors, which are adapted to be driven on soft or muddy ground. The said metal-retread covering comprising in combination a plurality of identical circular plate sections, said sections having means for removably securing the sections together. The circular sections embody a plurality of ground engaging traction cleats having grouter lugs thereon. Said sections embodying hollow U-shaped channel spacer means arranged midway between the outer circular edge portions thereof and providing liquid ballast compartments, each having bores in a wall closed by removable plugs.

---

The main object of this invention resides in the provision of a device of this character made of a metal which may be readily secured around large dual pneumatic tires, to provide increased traction means and to afford protection for the dual tires.

Another object of this invention is to provide a traction device for large dual pneumatic tires which will remain on the tires even though the tires be subjected to a very strong side thrust, which usually tends to dislodge the tires from the wheels.

Another object of this invention is to increase the frictional engagement between large dual pneumatic tires on wheels and the soil, to provide a device which consists essentially of a plurality of identical circular complementary members having means for operatively associating with the tires in a removable manner, to provide a device with obliquely extending cleats spaced parallel with each other and integrally formed upon the exterior surface thereof, the cleats cutting grooves into the soil in the driving direction, whereby the wheels and tires thereon are secured against sliding in a lateral direction, thereby to a secured rolling movement of the tires and wheels without the losses of speed and of energy resulting from a slipping movement, to avoid excavations of the soil and to secure a safe propulsion and steerage of the motor vehicle under all circumstances.

The traction cleats are characterized of being an inverted Y in vertical cross-section, diagonally arranged on the outer convex surface of the circular plate sections, the characteristics of the inverted Y configuration of the traction cleat imparts rigidity and impact strength to the circular plate sections, and affords a dual welding edge when securely attaching the traction cleats to the outer rim of the circular plate sections.

Further objects of this invention is to provide a traction device that provides the greatest possible strength per circular unit and per unit of the cross section.

These and further objects of my invention will be set forth in the following specification, reference being had to the accompanying drawings, and the novel means to which said objects are effectuated will be definitely pointed out in the claims.

In the drawings:

FIGURE 1 is a side elevational view showing a vehicle wheel and dual pneumatic tires with an improved traction device in position on the tires, mounted on rims that are fitted to the wheel, and fastened with common lugs now in use; a fragmentary portion of a tractor being shown therewith;

FIGURE 2 is a fragmentary transverse sectional view of the traction device mounted on a right rear dual tire arrangement, showing a fragmentary view of the circular plate and the hollow U-shaped channel spacer filled with suitable ballast;

FIGURE 3 is a perspective view of dual tires involved with this invention, a fragmentary portion of a tractor being shown in relation therewith;

FIGURE 4 is a perspective view of the improved traction device embodying this invention and adapted to be used on a right rear wheel of a tractor;

FIGURE 5 is a vertical sectional view of the improved traction device taken on line 5—5 of FIG. 4;

Figure 6:
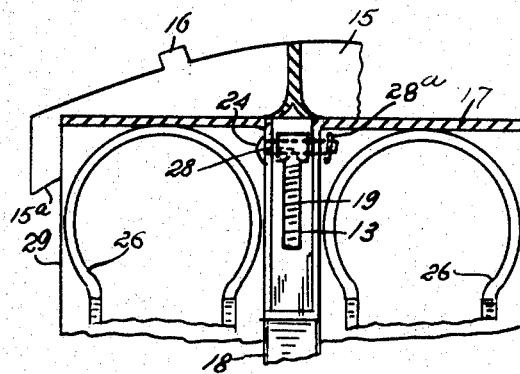
FIGURE 6 is a fragmentary transverse sectional view of the improved traction device mounted on dual tires also shown in section, the section arranged at bolt point.

Each traction device consists of two or more rim type sections; usually two semi-circular rim sections of plate type configuration are used and adapted to be bolted together to form one circular rim type device for use with dual tires; each rim section having an inwardly projecting, vertically extending divider rib member positioned substantially centrally of rim portion.

The divider rib member forming a septum and is in this invention a hollow U-shaped channel spacer integrally formed or rigidly attached to the interior concave surface of each of the circular plate sections, whereby the channel spacer fits between the dual tires when the circular rim sections are fitted over the wear surface of the dual tires, and free of contact with the side walls of the tires during installation. The rim and spacer form a section T-shape in cross section.

In the drawings, the pneumatic dual tires of the tractor, indicated generally at 26, may be of usual size or configuration, either with or without rubber cleats, but with cleats 27 in general practice as they do not interfere with the utilization of the present traction device. The traction device is illustrated generally by numeral 5, with wheel 6 mounted upon the axle of a tractor shown by numeral 7.

The traction device 5, as shown in the drawings consist of two semi-circular mating sections 17, forming an annulus; but more sections may be utilized if desirable; in general an annulus split on a diameter line is quick, easy and convenient to handle, and more than two sections are not necessary.

The sections 17 consist of a rim 17a, laterally flat and circular in vertical cross-section. A U-shaped channel spacer means 18 is rigidly secured to the inner surface of each section; said spacer means being semi-circular and hollow, and suitable to retain liquid or solid ballast 25.

Figure 10:
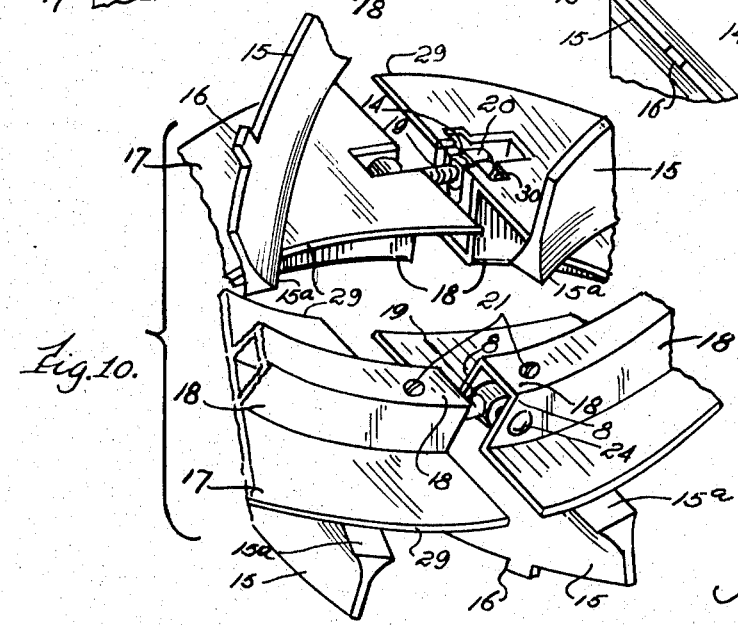
FIGURE 10 is a fragmentary side perspective exploded view of the improved traction device for use with a right rear tractor wheel and showing the various component parts in assembled position.

Said hollow spacers 18 having two vertical depending side walls 8, an inner annular wall 9, and end walls 23, forming chamber 22, clearly shown by FIGURES 5 and 10. The inner wall 9 is formed with a threaded bore 11 whereby the ballast can be inserted, liquid or solid, and said bore 11 is closed by a plug 21 for draining the ballast therefrom, or sealing the ballast therein. The sealed space may be referred to as a hollow ballast chamber and spacer means 18.

Each of the plate sections 17 with circular edges 29, have metal cleats 15 secured to the rim plate 17a by welding or other suitable means; said cleats are formed of hard metal such as iron or steel. The cleats 15 are each continuous, unbroken blades, each extending laterally beyond the side edges of rim plate 17a the overhanging portion designated by numeral 15a; the cleats 15 are arranged at approximately forty-five (45) degrees relative to the longitudinal axis of the sections 17. The metal area upon the vertical convex-surface and the lateral flat surface between the cleats 15 is a closed smooth polished surface to prevent mud from clinging thereto.

FIGURE 3 shows the dual-tires in combination with a tractor and ready for the traction device to be mounted thereon.

Figure 7:
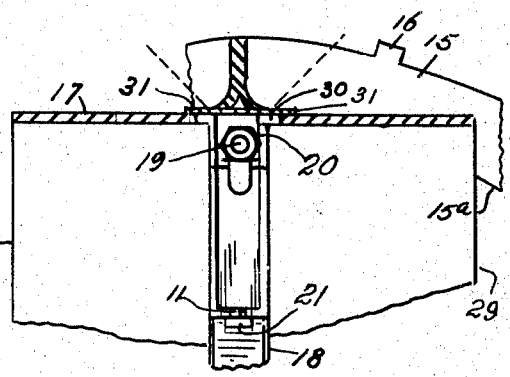
FIGURE 7 is a fragmentary transverse sectional view of the improved traction device at nut point, showing the bolt and nut locking means arranged within the U-shaped channel, taken on line 7—7 of FIG. 5.
Figure 8:
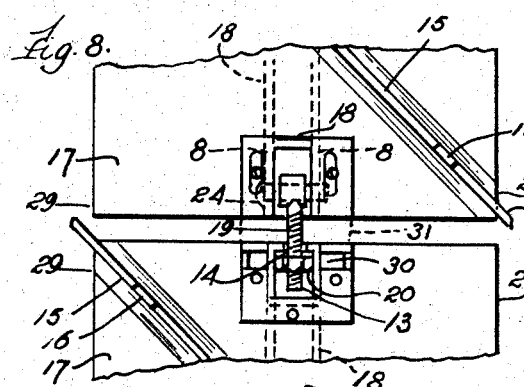
FIGURE 8 is a fragmentary external view of the two sections of the improved traction device, arranged for use and bolted together by nut and bolt means.
Figure 9:
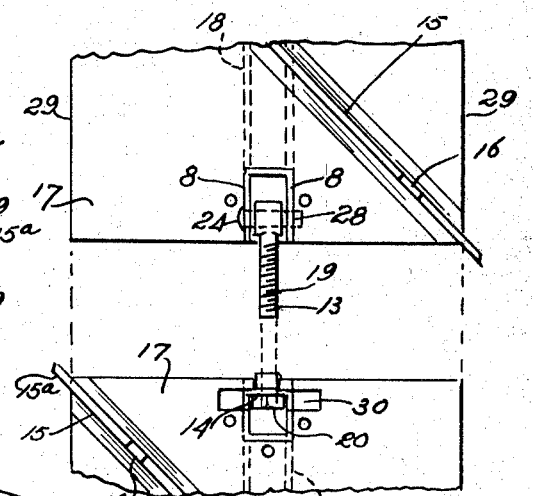
FIGURE 9 is a fragmentary external view of the two sections shown by FIG. 8, the nut removed from the bolt and the two sections spaced a slight distance apart from each other.

FIGURE 4 shows the traction device, ready to be separated into two parts and ready for mounting upon the tires shown by FIG. 3. FIGURE 5 shows the two sections clamped together and in section, the section taken vertically through the spacer means, or ballast compartments, showing the T-connecting bolt 19 with bolt head 24 arranged on a cross pin 28 which is secured in the side walls 8 of spacer means 18 by cotter pin 28a, the bolt 19 being pivotally mounted upon cross pin 28 and having a threaded free end 13. A fastening nut 20 is movably mounted upon the threaded free end 13 of bolt 19 after it is inserted in a slot in female wall means, 14 is the distal end of mating section 17. It is clearly shown that a T-bolt is arranged on one distal end, and a suitable metal wall member 14 with an open slot is formed at the opposite end of each section, so that the bolt of one section will function with the slot of the mating section. The tightening of the two nuts 20 upon the two bolts 19 will draw the two sections together and cause the two sections to form an annulus in tight clamping engagement with the tread of the dual tires, once the spacer means of each section is arranged in the open space between the dual tires. FIGURES 8 and 9 clearly show the bolt 19, nut 20, a space 30 in which a wrench can be placed to function with nut 20 to draw the sections 17 together. A cover plate 31 is shown by FIGURES 7 and 8 which covers the space 30, T-bolt 19 and nut 20 to keep the mud from the space 30 while in use.

The cleats 15 secured to the rim plate sections, are spaced parallel with each other, the cleats cutting grooves into the soil in the driving direction, whereby the wheels are prevented from sliding in a lateral direction, and giving a rolling movement without the loss of speed or slipping movement. Each cleat 15 is formed with a plurality of grouter lugs 16 upon the free peripheral edge portion thereof. These lugs 16 will dig into wood logs or the like preventing the sliding of the metal cleats over a natural slippery surface, common to most metal traction type wheels with smooth cleats thereon. The lugs 16 are rectangular in the surface plane thereof and each cleat 15 usually has two (2) or more lugs thereon, one on each side of the center, middle line of the rim sections 17. It is also to be noted that the spacer means 18 is rectangular in lateral cross-section; see FIG. 10.

FIGURE 10, a fragmentary side perspective exploded view of the traction device of this invention clearly shows by its upper portion, the bolt 19 and nut 20 fitted in the T-shaped slot 30, holding the sections 17 in close mating position. The cleats 15 are clearly shown with free overhanging portions 15a extending approximately two inches beyond the side edges 29 of the sections 17. The cleats 15 are generally arranged in reverse, those on a traction device for the left wheel extending forwardly and inwardly, as well as those on the traction device for a right wheel where they extend inwardly and forwardly, providing a maximum anti-slipping surface allowing the wheels to travel in a straight path. The lower portion of FIG. 10, clearly shows the rectangular cross-section of the U-shaped channel 18 integrally secured to the rim plate 17, forming a ballast chamber, semi-circular in vertical cross-section and rectangular in lateral cross-section. The plugs 21 are clearly shown in the bottom wall 9 of the ballast chamber 22, arranged mid-way between the side edges 29 of the rim 17.

One of the novel features of this invention resides in the provision of U-shaped channel spacers, which are securely attached to the interior concave surface of the circular plate sections, providing the plate sections with rigidity and impact strength, the U-shaped spacer means being hollow, provides a space for added ballast, convenient screw plugs being provided.

Another novel feature of this invention resides in the provision of a plurality of grouter lugs securely attached to the peripheral edge of the traction cleats, for added traction in slippery vegetation, and in wooded areas where the traction cleats come in contact with slippery tree roots, or when loading the vehicle on transporting equipment.

Another novel feature is that the traction cleats extend out beyond each side edge of the circular plate sections approximately two inches and are formed in reverse, those for the left side wheel extending forwardly and inwardly, as well as those on the right side thereof, where they extend inwardly and forwardly, providing a maximum traction into the soil allowing the wheels to travel in a straight path.

In the past, the only traction devices that were offered to the tractor wheel trade was spade-lugs, skid-chains or the like, these attachments created hill-climb, that is the tractor wheel had to climb over them, disturbing the earth and causing a great power loss, whereas with the present invention, the traction cleats diagonally arranged and permanently secured to the outer surface of the plate sections at a forty-five (45) degree angle, allowing the traction cleats to cut into the soil as the wheels turn and move forward, cutting into the firmer soil below the flotation area of the traction wheels, unlike rubber cleats on tires that bend, whereas with the present device the traction cleats in metal form will not bend, but under weight will penetrate deeper into the soil, providing the most traction possible, eliminating all hill-climb, one of the most known power consuming obstacles in wheel traction operations.

In erection the operator raises one wheel at a time, then places one circular plate section over the upper part of the dual pneumatic tires, then temporarily fastens the circular plate section to the dual tires, then turns the plate section and the wheel to the bottom side, then releases the jack, leaving all the weight set in the circular plate section, then set the other circular plate sections in place and bolt together.

While I have described one form of my invention I do not wish to be limited to the particular form shown and described as it is apparent to those skilled in the art that many modifications can be made without departing from the scope of the invention.

What I claim is:

1. A device for improving the traction of a motor vehicle driving wheel having dual pneumatic tires thereon, comprising in combination, a plurality of identical circular plate sections adapted to encircle the dual pneumatic tires of a motor vehicle wheel, means for removably securing said circular plate sections together and in engagement with the said dual pneumatic tires, said circular plate sections embodying a plurality of ground engaging traction cleats, said traction cleats embodying a plurality of grouter lugs, each of said circular plate sections embodying a hollow U-shaped channel spacer means arranged midway between the outer circular edge portions thereof, said hollow portion of said U-shaped channel spacer means preventing lateral displacement thereof relative to the said dual pneumatic tires when positioned between the tires, said hollow U-shaped channel means each providing a ballast compartment for liquid ballast therein, each compartment having a bore in a wall thereof closed by a plug whereby the ballast can be inserted and removed from the compartment.

2. A device for improving the traction of a motor vehicle as set forth in claim 1 further characterized in that said traction cleats are angularly arranged at forty-five (45) degrees relative to the circular edges of said sections and are securely attached to the outer periphery surface of said circular plate sections whereby said cleats import rigidity to the outer surface of said sections, said traction cleats embodying a plurality of grouter lugs transversely spaced apart thereon whereby greater traction is obtained in high vegetation and wooded root areas, and said traction cleats projecting laterally beyond the side edges of said circular plate sections.

3. A device for improving the traction of a motor vehicle as set forth in claim 1 further characterized in that said circular plate sections embodying U-shaped channel spacer means, said spacer means are centrally arranged and securely attached to the interior concave surface of said circular plate sections, said U-shaped channel spacer means add great rigidity and impact strength to said circular plate sections, said U-shaped channel spacer means are the same in length circumferentially approximately as that of said circular plate sections.

4. A device for improving the traction of a motor vehicle as set forth in claim 1 further characterized in that said means for removably securing said circular plate sections to said dual pneumatic tires are centrally arranged on the interior of both distal ends of said U-shaped channel spacer means, a movable threaded T-bolt is arranged on one distal end, and a suitable slot and a suitable threaded nut arranged on the opposite distal end, and said U-shaped channel spacer means arranged to enter into the common spaces between both dual tires when placed thereon free of contact with the side walls of said tires.

5. A demountable rim-type traction device for a vehicle wheel having dual pneumatic tires thereon, comprising an annulus composed of two semi-circular rim-type metal sections with laterally flat interior and exterior surfaces and circular peripheral side edges, bolt and nut type locking means secured to the ends of said sections for detachably securing the opposite ends of one section with the opposite ends of the second section, the sections being adapted to be drawn into contact with the tread of the pneumatic tire treads by said locking means, a plurality of diagonally disposed metal traction cleats rigidly secured to the exterior surface of each of the said metal sections between the peripheral side edges thereof, the cleats projecting radially beyond the periphery of the sections, an inwardly depending hollow channel spacer means rigidly secured to the interior surface of each section midway between the peripheral edges thereof forming a two compartment annulus to be disposed in the groove between the tire treads when arranged thereon, thereby preventing lateral shifting of the traction device to said tires, said two hollow channel spacer means each forming a semi-circular shaped liquid ballast compartment, each compartment having two bores in a wall thereof closed by a plug whereby the ballast can be inserted and removed from said ballast compartment.

References Cited

UNITED STATES PATENTS

| | | | |
|---|---|---|---|
| 701,180 | 5/1902 | Einfeldt | 301—43 |
| 996,945 | 7/1911 | Sharick | 301—41 |
| 1,257,778 | 2/1918 | Allen | 301—41 |
| 2,441,471 | 5/1948 | Chausse | 152—182 XR |
| 2,536,554 | 1/1951 | Larsen | 152—228 |
| 2,780,497 | 2/1957 | Cameron | 301—41 |
| 2,977,158 | 3/1961 | Iblings | 152—228 |
| 2,982,585 | 5/1961 | Murtaugh | 305—54 |
| 3,179,145 | 4/1965 | Weier | 152—228 XR |

DRAYTON E. HOFFMAN, *Primary Examiner.*

U.S. Cl. X.R.

152—191, 225, 227; 301—41, 43; 305—54